173-121
SR
10/22/85 OR 4,548,278

United States Patent [19]
Gidlund

[11] Patent Number: 4,548,278
[45] Date of Patent: Oct. 22, 1985

[54] PERCUSSION TOOL

[75] Inventor: Per A. L. Gidlund, Täby, Sweden

[73] Assignee: Atlas Copco Aktiebolag, Nacka, Sweden

[21] Appl. No.: 572,764

[22] Filed: Jan. 23, 1984

[30] Foreign Application Priority Data

Jan. 24, 1983 [SE] Sweden ................................ 8300340

[51] Int. Cl.$^4$ .......................... B23B 45/16; B25D 3/00

[52] U.S. Cl. ...................................... 173/121; 30/168; 30/277; 30/367; 173/139

[58] Field of Search ............... 173/121, 139, 118, 128; 30/366, 367, 277, 168, 169; 181/207, 209, 230

[56] References Cited

U.S. PATENT DOCUMENTS

| | | | |
|---|---|---|---|
| 1,817,591 | 8/1931 | Slatcher . | |
| 2,861,778 | 11/1958 | Spurlin | 173/139 |
| 3,177,952 | 4/1965 | West | 173/121 |
| 3,181,626 | 5/1965 | Sussman | 173/53 |
| 3,559,753 | 2/1971 | Meri | 173/139 |
| 3,861,494 | 1/1975 | Grego | 181/33 A |

FOREIGN PATENT DOCUMENTS

| | | |
|---|---|---|
| 0017635 | 10/1980 | European Pat. Off. . |
| 0055244 | 6/1982 | European Pat. Off. . |
| 3123537 | 12/1982 | Fed. Rep. of Germany . |
| 666302 | 9/1929 | France . |
| 2163287 | 7/1973 | France . |
| WO79/00496 | 9/1979 | PCT Int'l Appl. . |
| 1539157 | 1/1979 | United Kingdom . |
| 2020598 | 11/1979 | United Kingdom . |

*Primary Examiner*—Frank T. Yost
*Assistant Examiner*—Hien H. Phan
*Attorney, Agent, or Firm*—Frishauf, Holtz, Goodman & Woodward

[57] ABSTRACT

A power operated percussion tool in which a shoulder (28) in the tool housing (10, 17) defines a rear rest position for working implement (12) attached to the tool, and in which an energy absorbing bias unit (23, 31) is arranged to resiliently load the working implement (12) toward the rest position. The bias unit (23, 31) comprises a spring (23) and a shock wave mitigating ring assembly (31) and acts between a rearwardly facing shoulder (22) in the housing (10, 17) and a forwardly facing shoulder (30) on the working implement (12). The ring assembly (31) includes two spring steel rings (32, 33) formed with mating conical contact surfaces for transforming axial load variations into radial deformation of the rings (32, 33).

4 Claims, 2 Drawing Figures

PERCUSSION TOOL

BACKGROUND OF THE INVENTION

This invention relates to percussion tools of the type in which a reciprocating hammer piston delivers repeated blows to a working implement introduced into the tool housing through a front opening therein. An example of tools of this type is a chipping hammer.

Usually, this type of tool is intended to be manually supported which means that the tool including the chisel connected thereto is applied onto a work piece by a trained operator. In previous tools the chisel is freely displaceable relative to the housing between a rear blow receiving position and a forward idle or rest position, and the operator has to take into account this difference in chisel tip position when moving the tool from one working position to another. When, for instance, using this type of tool removing a burr from iron castings the chisel is thrown over to its forward position each time the burr gives away, and when moving the tool into a new working position, i.e. applying the chisel tip against the burr still to be removed, the operator first has to retract the entire tool to ensure that the chisel tip is well behind the burr before moving the tool sidewise and reapply it on the burr. This is easily and automatically compensated for by the operator, because in hand held tools the axial displacement of the chisel relative to the tool housing is relatively small compared to the inevitable axial displacement of the entire tool when a breakthrough occurs.

When, however, mounting the chipping hammer on a mechanical support it is desirable to avoid any longitudinal displacement of the chisel relative to the tool housing to, thereby, facilitate the movement pattern of the tool relative to the work piece. This is obtained by employing a return spring by which the working implement is always returned to its blow receiving or rest position in the housing after each stroke.

A problem concerned with this type of spring biassed working implement is that the spring is exposed to a very severe strain resulting from the repeated impacts delivered by the hammer piston. This strain is caused by the shock waves which arise each time the working implement is hit by the hammer position, and the fatigue strength of the spring is not able to withstand this kind of treatment for a longer period of time.

The main object of the invention is to create an energy absorbing means which effectively reduces the shock wave stresses in the bias spring.

A preferred embodiment of the invention is hereinafter described in detail with reference to the accompanying drawing.

DETAILED DESCRIPTION

Figure 1:
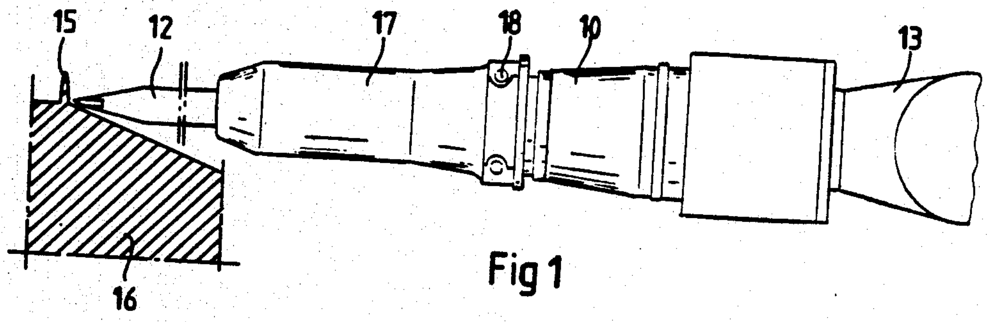
FIG. 1 shows a side view of a chipping hammer in its working position relative to a work piece.

The percussion tool shown in the drawing figures comprises a pneumatically powered impact mechanism the main parts of which is a housing 10 and a hammer piston 11. The latter are intended to deliver repeated blows on the rear end of a chisel 12 attached to the tool. The hammer piston drive means does not form any part of the invention and is not shown and described in detail.

In FIG. 1 the tool is carried by a mechanical support 13 attached at the rear end of the housing 10. The chisel 12 is put into a working position relative to a burr 15 on an iron casting 16. The tool is carried by a mechanical support and so is the work piece, i.e. the iron casting 16, which means that the work piece trimming operation is mechanized and automatically controlled. This does not necessarily mean that the chipping hammer is moved about the work piece is fixed on a stationary support. On the contrary, in some applications it might be advantageous to move the work piece in a certain pattern in relation to a stationary tool.

The housing 10 comprises a hollow nose piece 17 which is detachably secured to the main part of the housing 10 by two transverse lock pins 18 which engage a circumferential groove 19 on the housing main part. The nose piece 17 is provided with a front opening 21 through which the chisel 12 extends and defines an inner rearwardly facing shoulder 22 against which a coil type compression spring 23 is supported.

The chisel 12 is formed with an annular collar 25 and a hexagonal shank portion 26. The latter is guidingly received in a chuck bushing 27 which is rigidly mounted in the housing 10. The forward end of the chuck bushing 27 forms a forwardly facing shoulder 28 on which the annular rear face 29 of the collar 25 rests. The forwardly facing end of the collar 25 forms an annular shoulder 30 against which a ring assembly 31 is pressed by the spring 23.

The ring assembly 31, which together with the spring 23 forms an energy absorbing bias unit, comprises an inner ring 32 and an outer ring 33. These rings 32, 33, are made of spring steel and are formed with mating conical contact surfaces 35 and 36, respectively.

The functional features of the above described tool is described below with reference to FIG. 2. In this figure, the chisel 12 and the bias unit, i.e. spring 23 and rings 32, 33, are shown in their rest positions. This means that the rearwardly facing shoulder 29 of the collar 25 is resting against the forwardly facing shoulder 28 of chuck bushing 27. In its working position the tool is disposed relative to the work piece such that the tip of the chisel 12, in the rest position of the latter, is located 1–3 millimeters behind the burr 15 to be worked. This means that for each blow delivered by the hammer piston 11 the chisel 12 is accelerated towards the burr 15 which means that the impact energy delivered by the hammer piston 11 has been transformed into kinetic energy. As the chisel tip hits the burr 15 the kinetic energy is utilized for breaking away the burr 15.

During and after each impact stroke of the chisel 12, the spring 23 and the ring assembly 31 are effective to return the chisel 12 to the rest position in which the rearwardly facing shoulder 29 on the chisel collar 25 rests against the forward facing shoulder 28 of the chuck bushing 27. As long as the burr 15 resists the working, the return movement of the chisel 12 is just 1–3 millimeters, but as the burr 15 after a number of strokes breaks away the chisel return movement suddenly increases by 5–10 times.

Regardless of the length of the chisel stroke, the ring assembly 31 is effective in absorbing high frequency shock waves and protecting the spring 23 from fatal fatigue stresses caused thereby. This is obtained partly by the elastic radial deformation or expansion of the outer ring 33 as the inner ring 32 is pressed further into the outer ring 33 and partly by the internal friction resistance developed between the conical surfaces 35, 36 of the rings during this sequence.

Since this friction resistance together with the elastic expansion of the outer ring 33 is effective in absorbing high frequency shock waves, shock waves of lower frequency only may reach the spring 23. By this arrangement, a long operation life of the spring 23 is assured.

Figure 2:
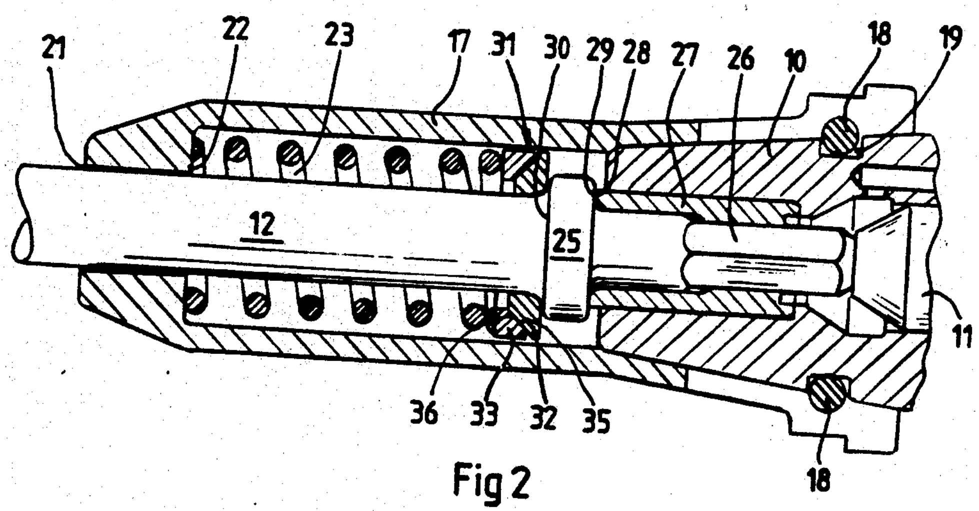
FIG. 2 shows, on a larger scale, a longitudinal section through the front part of the tool shown in FIG. 1.

Due to the bias action of the spring and steel ring unit, the chisel 12 is continuosly loaded by a certain force toward its rest position, shown in FIG. 2. This means that the chisel 12 is returned to its rear end position between each impact stroke which means that the chisel 12 always starts on its working strokes from a position a couple of millimeters behind the burr 15 to be worked. See FIG. 1. This makes it possible to move the tool or the work piece sidewise into new working positions without retracting the tool or otherwise changing lengthwise relationship between the tool and the work piece.

I claim:

1. In a percussion tool comprising a housing (10, 17), a hammer piston (11) reciprocably powered in the housing (10,17), a front opening (21) in the housing (10, 17) for receiving the rear end portion of a working implement (12), a forwardly facing shoulder (28) in the housing (10, 17) arranged to be abutted by a rearwardly facing shoulder (29) on the working implement (12) and to define an axial rest position for the working implement (12) relative to the housing (10, 17), and an energy absorbing bias unit arranged between a rearwardly facing shoulder (22) on the housing (10, 17) and a forwardly facing shoulder (30) on the working implement (12), said energy absorbing bias unit comprising a spring (23) for resiliently loading the working implement (12) toward said rest position, the improvement wherein:

said energy absorbing bias unit further comprises a shock wave mitigating pair of ring elements (32, 33) interposed between said spring (23) and said forwardly facing shoulder (30) on said working implement (12), said ring elements (32, 33) having mating substantially conical contact surfaces (35, 36), whereby a portion of the impact energy received by said energy absorbing bias unit during each impact stroke of said hammer piston (11) is absorbed by radial elastic deformation of said ring elements (32,33) as well as by frictional resistance between said mating contact surfaces (35, 36) of said ring elements (32, 33) during said radial elastic deformation of said ring elements (32, 33).

2. The percussion tool of claim 1, wherein said ring elements (32, 33) are made of spring steel.

3. The percussion tool of claim 1, wherein said conical contact surfaces of said ring elements have axes which are substantially colinear with the longitudinal axis of said working implement.

4. The percussion tool of claim 1, wherein said substantially conical surfaces (35, 36) of said ring elements (32, 33) extend in the axial direction of said working implement.

* * * * *